Nov. 21, 1939.  C. C. STREET  2,181,077
SHOCK-ABSORBING DIAL INDICATOR
Filed Oct. 19, 1938
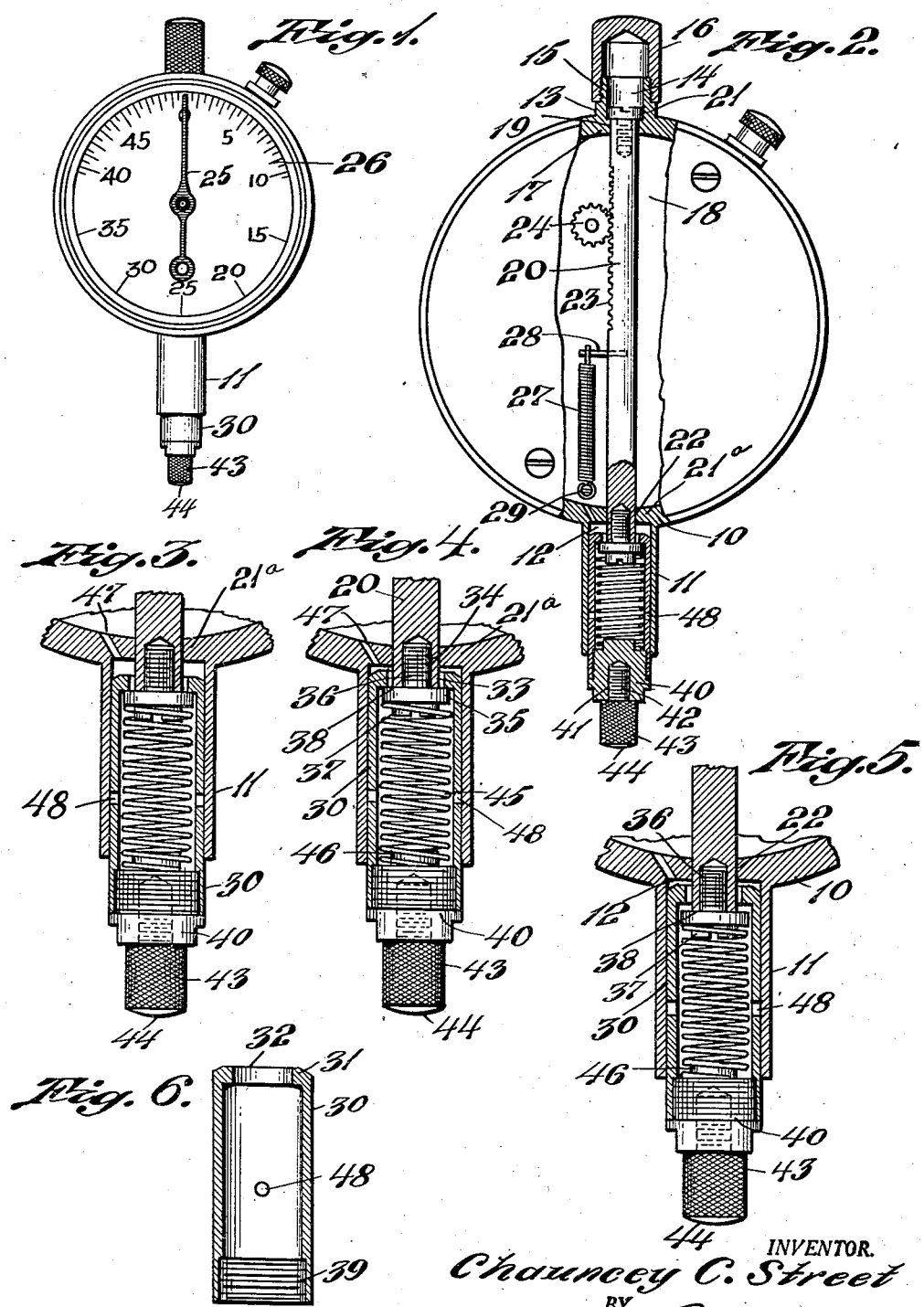
INVENTOR.
Chauncey C. Street
BY Barlow & Barlow
ATTORNEYS.

Patented Nov. 21, 1939

2,181,077

UNITED STATES PATENT OFFICE 2,181,077

SHOCK-ABSORBING DIAL INDICATOR

Chauncey C. Street, Providence, R. I., assignor to Federal Products Corporation, a corporation of Rhode Island Application October 19, 1938, Serial No. 235,797

2 Claims. (Cl. 33—172)

This invention relates to a dial indicator of the type having delicate actuating mechanism and has for one of its objects to provide a cushioning arrangement whereby shock which may be given to the contact or feeler portion which contacts the work will not be transmitted into the delicate operating mechanism of the instrument.

Another object of the invention is to cause the instrument to operate in a normal manner notwithstanding the fact that shockproof mechanism is provided.

Another object of the invention is to provide an arrangement whereby the shock absorbing spring will function only when absorbing shocks given to the instrument as distinguished from being flexed during each movement of the operating plunger and whereby the normal life of the shock absorbing spring may be increased.

With these and other objects in view, the invention consists of certain novel features of construction, as will be more fully described, and particularly pointed out in the appended claims.

In the accompanying drawing:

Fig. 1 is a plan of the dial indicator, including the shock absorbing mechanism which I have provided;

Fig. 2 is a view similar to Fig. 1 on a larger scale and partly broken away and in section to better illustrate the operable mechanism which is connected with this invention;

Fig. 3 is a fragmental sectional view of a part of the operating mechanism of the device in its outermost position;

Fig. 4 is a view similar to Fig. 3, showing the plunger in an inwardly position;

Fig. 5 is a view similar to Figs. 3 and 4 but illustrating the position immediately after shock has occurred on the contact member; and Fig. 6 is a sectional view of the sleeve of the contact member.

In the operation of delicate indicating instruments, the feeler or contact portion through which the indicator is caused to operate is sometimes subjected to severe shocks which in many instruments are transmitted directly through the operating plunger to the delicate gearing within the instrument which causes strain upon these delicate parts and, as a consequence, excessive wear and inaccuracy of the instrument after considerable usage; and this invention has primarily to do with the absorbing of such shocks that they will not be transmitted to the delicate mechanism of the indicator by an arrangement which will maintain the usual normal principles throughout the operation of the instrument and in which the resilient means used for absorbing the shock will come into operation only when necessary to absorb the shock and will not be flexed during each movement of the instrument to become unnecessarily exhausted; and the following is a more detailed description of the present embodiment of this invention, illustrating the preferred means by which these advantageous results may be accomplished:

With reference to the drawing; 10 designates a casing of the instrument which is generally cylindrical comprising a casting provided with a stem 11, hollowed out or provided with a bore 12; while diametrically opposite the stem there is provided a projection 13 having a bore 14 and externally threaded as at 15 for the reception of a dust cap 16. The wall 17 separating the cavity 18 of the casing and the bore 14 is provided with an opening 19, the edged walls of which provide a slidable bearing for the plunger 20 which is provided with a head 21 by means of a bolt being threaded into the end of the plunger for engagement with the stock about the opening 19 to limit the downward movement of the plunger. The plunger is also slidably guided by the edge walls of the opening 22 through the wall 21 of the casing which separates the cavity 18 and the bore 12 to direct this end of the plunger in its movement in the casing.

The plunger is provided with a rack 23 for engaging the pinion 24 for operating pointer 25 through some delicate mechanism not shown to move over the dial 26 to indicate the amount of movement of the plunger in thousandths or in some selected units of measurement. A spring 27 engaging the pin 28 which is fixed in the plunger, and an anchor 29 which is fixed in the casing, at all times tends to move the plunger downwardly as viewed in Fig. 2 or into the stem 11.

The contact member is slidably mounted in the stem and loosely engages the plunger; this contact member consists of a sleeve 30 having an inturned lip 31 at one end, providing an opening 32 therethrough which loosely embraces the end portion 33 of the plunger. This end portion of the plunger is provided with a threaded opening 34 and an enlargement 35 engages this end of the plunger and is held in such position by the bolt 36, having head 37 passing through this enlargement 35, being threaded into the opening 34 to hold it firmly against the end of the plunger 30, thus providing an abutment by its upper surface 38 with which the lip 31 of the sleeve engages so as to limit the relative outward movement of the sleeve 30 and the plunger 20. The opening 32 is sufficiently large that so should any rocking or out-of-alignment movement be caused by the plunger and the contact member or sleeve 30 thereof moving in different axial direction, no jamming of the parts will occur and this arrangement also provides for perfect movement of the parts without precision alignment of the axis of the plunger and the axis of the contact member in its sliding movement in the stem 11. The outer end of the sleeve 30 is provided with a bore 39 for the reception of closure plug 40 which is threaded thereinto and which is in turn provided with a threaded bore 41 to receive the threaded stem 42 of the contact head 43 which is rounded on its outer surface as at 44 for engagement with the different parts with which it is to contact. Openings 48 in the sleeve enable the sleeve to be held while the plug is screwed thereinto or the contact head 43 is screwed into the plug. A resilient means in the form of a compression spring 46 is located within the contact sleeve and encircles the head 37 of the bolt 36 by which this end is guided and held in proper relation to the plunger while a boss 46 on the plug 40 serves to guide and hold in position the opposite end of this compression spring.

The wall 21 is drilled as at 47 to provide an air vent that no compression of any air in the stem will affect in any manner the operation of the delicate instrument.

The spring 45 is stronger than the spring 27 so that in normal operation no compression of the spring 45 occurs; pressure on the contact head 43 will cause the contact member and through the spring 45, which will not give in ordinary normal operation of the instrument, will cause the plunger to move inwardly, stretching the spring 27 and causing the rack 23 to operate the gear 24 and in consequence the pointer 25 over the dial 26. However, if the parts are as in Fig. 3 and some sudden shock occur which by reason of its energy would present a force greater than the chosen spring 45, this spring would then flex, permitting the contact member to slide along the plunger 20 as shown in Fig. 5 and the plunger to gradually follow under the differential action of springs 27 and 45 to the position shown in Fig. 4 to operate the parts of the mechanism, thus preventing a direct thrust being transmitted through the plunger to the delicate mechanism of the instrument and providing that the delicate mechanism will always be guarded by the spring 45 which may be chosen with a desired tension for performing the results contemplated.

The foregoing description is directed solely towards the construction illustrated but I desire it to be understood that I reserve the pivilege of resorting to all the mechanical changes to which the device is susceptible, the invention being defined and limited only by the terms of the appended claims.

I claim:

1. In an indicating instrument, a casing, a tubular stem projecting from the casing, a wall separating the cavity of said stem and casing and provided with a bearing opening, a plunger slidably guided in said bearing opening, a contact member slidably guided in said stem and projecting therebeyond and loosely engaging said plunger, means to limit the relative outward movement of said plunger, means on said plunger and member to limit the outward movement of said member and a spring acting between said member and plunger to cause outward movement of said member and permit inward movement of said member relative to the plunger upon sudden application of a force overcoming the expansion force of said spring.

2. In an indicating instrument, a casing, a tubular stem projecting from the casing, a wall separating the cavity of said stem and casing and provided with a bearing opening, a plunger slidably guided in said bearing opening and provided with an enlarged end forming an abutment, means to limit the outward movement of said plunger, a contact member slidably guided in said stem and projecting therebeyond and loosely engaging said plunger by extending over said enlarged end and with an inturned lip engaging said abutment to limit the outward movement of said member, and a spring acting between said plunger and contact member to cause outward movement of said member with reference to said plunger and permit inward movement of the member relative to the plunger upon sudden application of a force overcoming the expansion force of said spring.

CHAUNCEY C. STREET.